United States Patent [19]

Neuroth

[11] Patent Number: 4,644,716
[45] Date of Patent: Feb. 24, 1987

[54] BUILDING-INTEGRATED FLUORESCENT SOLAR COLLECTOR

[75] Inventor: Norbert Neuroth, Mainz-Mombach, Fed. Rep. of Germany

[73] Assignee: Schott Glaswerke, Mainz, Fed. Rep. of Germany

[21] Appl. No.: 743,448

[22] Filed: Jun. 11, 1985

[51] Int. Cl.$^4$ .................... G04H 14/00; H01L 31/04
[52] U.S. Cl. ................................ 52/173 R; 136/247
[58] Field of Search ...................... 52/173 R; 136/247

[56] References Cited

U.S. PATENT DOCUMENTS 4,188,238  2/1980  Boling .................... 136/247
4,190,465  2/1980  Boling .................... 136/247

FOREIGN PATENT DOCUMENTS 3125622  1/1983  Fed. Rep. of Germany ...... 136/247

OTHER PUBLICATIONS

A. Goetzberger et al, *Appl. Physics*, vol. 14, pp. 127–128 (1977).

Primary Examiner—Aaron Weisstuch
Attorney, Agent, or Firm—Millen & White

[57] ABSTRACT

Conventional fluorescent solar collectors are utilized as external surfaces for building units. Since fluorescent solar collectors need not be aligned with the sun to obtain a high degree of efficiency, they are utilized as wall units or wall elements, as well as roof units or roof elements.

2 Claims, 8 Drawing Figures

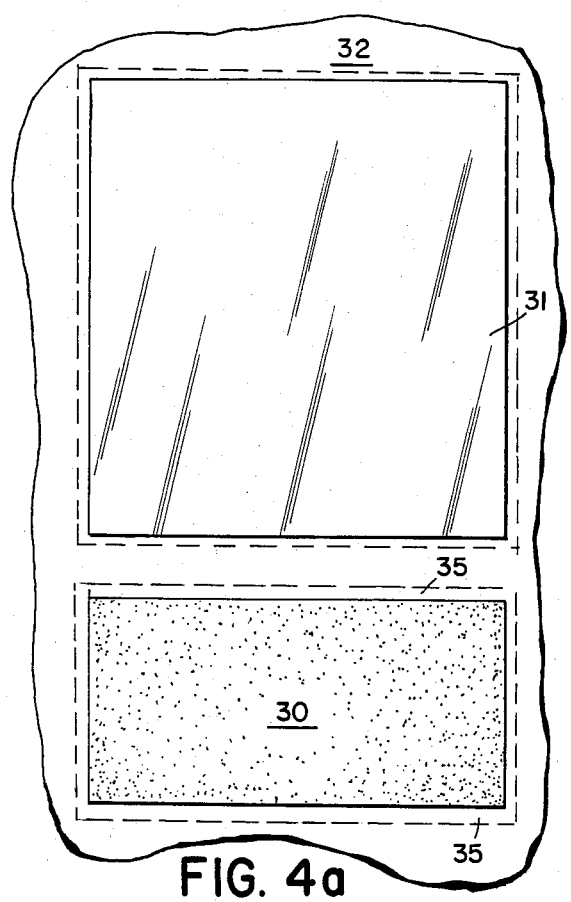
FIG. 4a
FIG. 4b
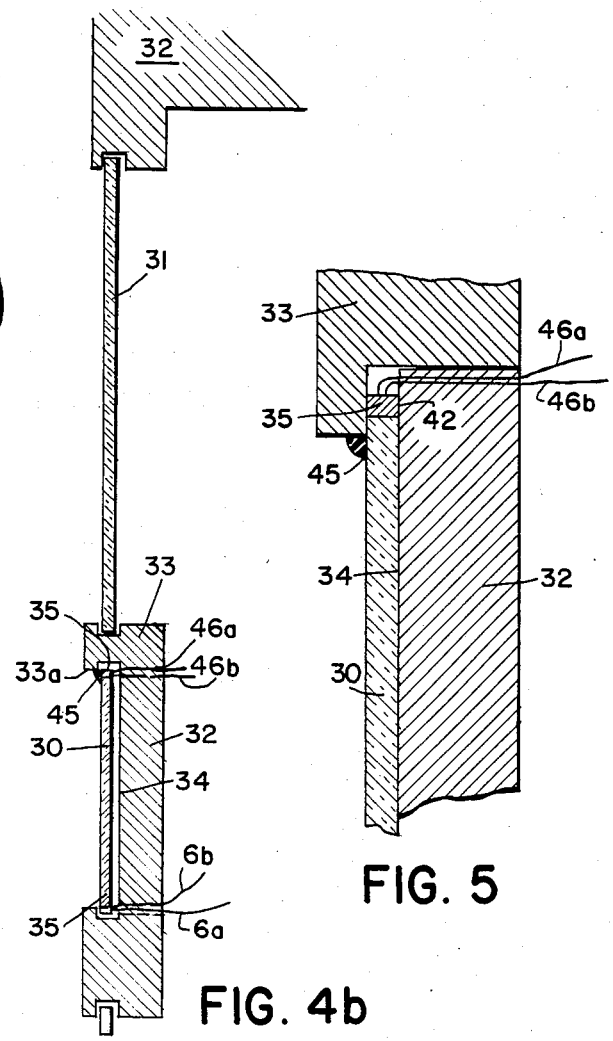
FIG. 5
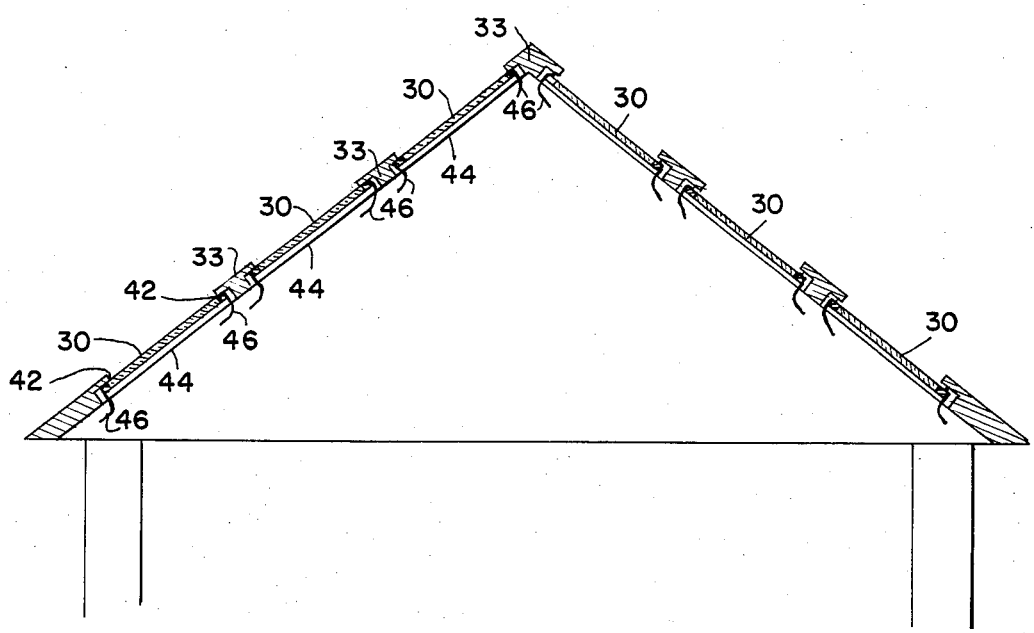
FIG. 6

BUILDING-INTEGRATED FLUORESCENT SOLAR COLLECTOR

BACKGROUND OF THE INVENTION (1) Field of the Invention

The invention relates to the use of a conventional fluorescent solar collector as an external building unit.

(2) Technical Considerations and Prior Art

Solar accumulators (solar collectors) are well known. Conventional solar collectors, however, exhibit the disadvantage that their sensitive surface must be oriented in correspondence with the position of the sun. In some cases, expensive tracking devices are required to accomplish this orientation.

Fluorescent solar collector systems have an advantage over other collector systems in that the fluorescent panels need not be aligned exactly in accordance with the position of the sun. Even incident rays directed obliquely with respect to the panel are absorbed by the panel and can contribute toward fluorescent excitation.

Fluorescent solar collectors generally consist of either a single fluorescent disk carrying photocells along its rim, or of a combination of several such disks. These disks are configured to absorb completely a portion of the short-wave solar spectrum, convert the same into long-wave radiation and emit the long-wave radiation. The photocells arranged on the rim of the disk are sensitive to such long-wave radiation. Each fluorescent center in the disk emits toward all sides. The portion of the radiation impinging on the surface of the panels at a total angle of reflection, or under a larger angle, is completely reflected by the surface and passes, after several reflections, into the photocells.

Such a conventional fluorescent solar collector is shown in FIG. 1 of the drawings. The fluorescent panel 1 can consist of a synthetic resin or of glass is provided with a fluorescence agent in the form of activating ions. Suitable glasses are silicate, borosilicate, borate, or phosphate glasses containing, as the activating ions, for example $Yb^{3+}$, $Nd^{3+}$, or $Cr^{3+}$. German Patent DOS No. 3,305,853, incorporated herein by reference, discloses suitable glasses for fluorescent panels. These activating ions absorb the sunlight impinging from above and transform the solar energy into fluorescent energy. Referring again to FIG. 1, an activating ion is indicated at point 3 which emits fluorescent radiation in all directions. Two rays 4 and 5 are representative of all radiation emitted by the ion. By total reflection on the panel surfaces, the largest portion of the fluorescent radiation is conducted to the panel rim where the photocells 2a, 2b are arranged. Preferably, silicon cells and $CdS/Cu_2S$ cells are employed, exhibiting maximum sensitivity in a spectral range of 550–1,000 nm and 450–900 nm, respectively. In order to keep losses at a minimum, the activating ions are selected so that the fluorescent radiation is within these spectral ranges. The electrical energy generated by the photocells is tapped by the terminals 6a, 6b.

SUMMARY OF THE INVENTION

In view of the foregoing consideration, it is an object of the present invention to utilize a fluorescent solar collector as a structural element, i.e. for the facing on the outer surfaces of buildings.

Upon further study of the specification and appended claims, further objects and advantages of this invention will become apparent to those skilled in the art.

In accordance with the instant invention, fluorescent collectors are mounted on a house or building wall and on any roof surface, even on those that do not receive any direct solar radiation (e.g. north walls), since even diffuse light from the sky is suitable for excitation of fluorescent material.

An especially advantageous site for mounting the fluorescent solar collector on a building, but in particular on high-rise buildings, is the area below the window parapets. It is customary in high-rise buildings to fully glaze the walls. The part above the parapet is designed as a window with transparent glass. The part below the parapet down to the flooring of the floor is normally provided with a facing of opaque glass or a ceramic material. According to this invention, substantially all external surfaces of a building, except for the window areas, are covered with fluorescent solar collector panels. It is especially convenient from a technical viewpoint to line the area below the parapet with fluorescent solar collector panels which is a preferred site for mounting a fluorescent panel or panel set. Walls that do not contain a window can be covered entirely with fluorescent solar collectors. This is especially appropriate for south walls and roof areas.

The instant invention further contemplates utilizing the fluorescent panels as the actual facing or sheathing for buildings so that the exterior surface of a building actually becomes a generator of electric current.

BRIEF DESCRIPTION OF THE DRAWINGS

FIGS. 4a and 4b are a top view and a sectional view, respectively, of a fluorescent solar collector mounted on a house wall.

FIG. 5 is a section through a house wall having a fluorescent solar collector inserted therein.

FIG. 6 is a section through a roof gable covered with fluorescent solar collectors.

DESCRIPTION OF THE PREFERRED EMBODIMENT

Figure 1:
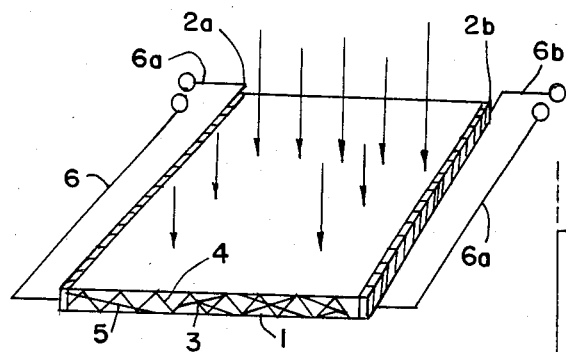
FIG. 1 is a perspective view showing a conventional fluorescent solar collector.

FIG. 1 shows a conventional fluorescent solar panel, which in accordance with one embodiment of the instant invention, is used as a building panel and serves as at least a portion of the facing or sheathing of a building such as a house, or perhaps an apartment building, office building, or the like. The unit need not provide structural strength to the building, but may merely serve as a surface to preserve the weather integrity of the building. In essence, the unit becomes a wall element of the building forming the exterior surface of the building.

Figure 2:
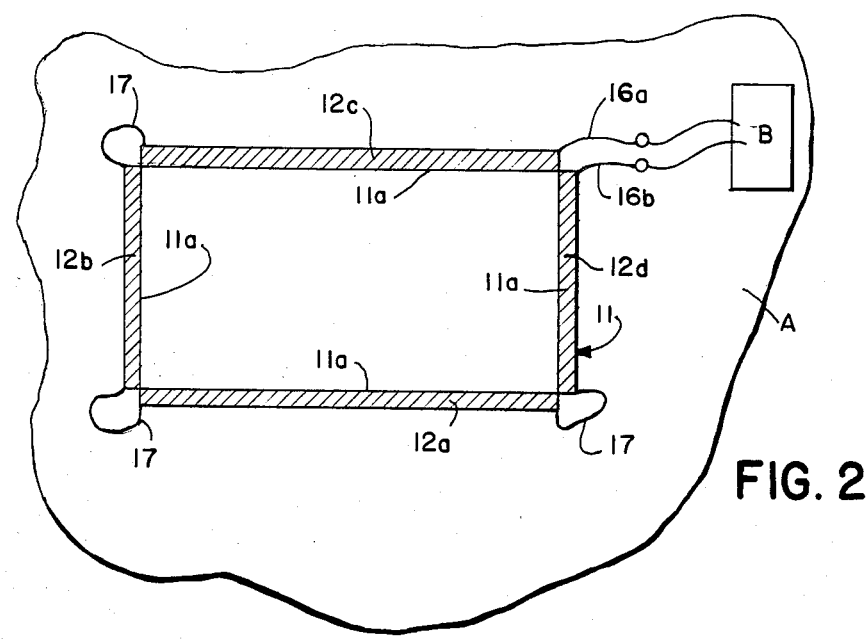
FIG. 2 is a top view showing a rectangular fluorescent solar collector used as a building unit.

FIG. 2 is a top view of a fluorescent solar collector, designated generally by the numeral 11, which can be utilized as an external building unit. Photocells 12a, 12b, 12c, and 12d are arranged along around the periphery 11a of the panel 11. The photocells 12a–12d are attached to the panel 11 by means of a transparent adhesive. The four photocells 12a–12d are series-connected to one another via wires 17, and the thus-generated electric current is conducted away from the collector 11 by terminals 16a, 16b. It is, of course, also possible to connect these four photocells in parallel. The solar collector 11 is mounted on the outer surface A of a building (not shown) and in accordance with one embodiment of the invention actually forms the facing, outer sheathing or covering of the building. The terminals 16a and 16b are connected to a device B associated with the building defined by the wall A, which device requires electric current for operation. Such a device may be or include heating and air conditioning systems, lighting systems, or power systems for appliances; or the device may be a DC/AC converter for feeding supplemental AC current into conventional AC line current externally supplied to the building.

The dimensions of a fluorescent solar collector such as collector 11 illustrated in FIG. 2 are dependent generally on the external surface area A of building to be covered. When positioned below the window parapet, the dimensions conform to the height of the window parapet and the width of the window. Customary dimensions for such a unit are 100 cm × 150 cm.

Figure 3A:
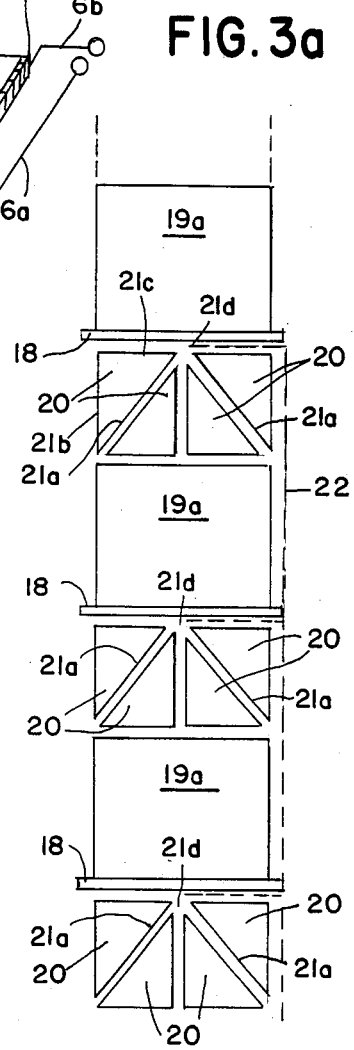
FIGS. 3a and 3b are a top view and lateral view, respectively, of a house wall having triangular fluorescent solar collectors mounted thereon.
Figure 3B:
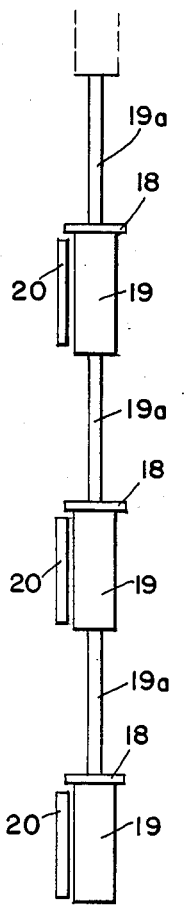

FIGS. 3a and 3b show, in a top view and in a lateral view, respectively, portions of a house wall 19 having windows 19a therein. The areas of this wall below the window parapets 18 are covered with triangular fluorescent solar collectors, designated generally by the numeral 20. In order to minimize costs, it is desirable to mount only one photocell 21 on each of the panels, and to render the remaining sides of the panels reflective by providing the remaining sides with a reflective coating of, for example, alumimum. Furthermore, it is desirable for the average path length of light rays in the solar collector panel to be as short as possible and for the number of reflections on the mirror-coated surfaces is to be as small as possible. Consequently, it follows that a right triangle is the optimum configuration for one of the panels 20. The photocell or photocell array 21 for each panel 20 is positioned at the hypotenuse 21a, of that panel, and the sides 21b and 21c of the panel are provided with highly reflective coatings. Accordingly, the array of photocells 21a of each set of triangular solar panels 20 converge at a common point of convergence 21d.

By suitable interconnection of all solar panel units 20—in series or in parallel—via connecting wires 22 one may for example, charge batteries, heat water, or operate a heating system. By means of suitable, subsequently arranged coverters (not shown), the DC voltage produced by the panels 20 can be converted by conventional means into AC voltage and fed into the house wiring (not shown).

FIGS. 4a and 4b show a rectangular fluorescent solar collector 30 installed underneath a window 31. The shape of the collector 30 corresponds to the shape of the collector illustrated in FIG. 2. The fluorescent solar collector 30 is secured against the house wall 32 by means of holders 33 which have slots with lips 33a extending over the rim of the collector panel. Preferably, the side of the house wall 32 facing the fluorescent solar collector 30 or the back of the panel is provided with a diffuse-reflecting layer 34, 44 of bronze paint or white paint, so that the small portion of solar radiation not absorbed during the first pass through the panel travels once again through the panel and can be completely absorbed so as to generate additional photons for the photocells 35 disposed on opposite edges of the panel 30.

As can be seen in detail in FIG. 5, each of the holders 33 extends over the rim or edge 42 of the fluorescent solar collector 30 and entirely along its length so that the photocell 35 is covered completely by the holder and thus protected from environmental influences. In order to prevent penetration of moisture, a gasket 45 is disposed between the collector panel 30 and the holder 33. Leads 46a and 46b from the photocell 42 extend over the edge of the solar collector 32 and back into the building.

FIG. 6 shows a possible arrangement of fluorescent solar collectors 30 as roof units. The design, arrangement and mounting of these roof units 30 corresponds to those of the aforedescribed external building units 30 shown in FIGS. 4 and 5, with identical reference numerals referring to similar structure. It is also within the scope of this invention to use the triangular panels 20 of FIGS. 3a and 3b as roof panels.

The proposed method makes it possible to utilize solar energy collection in houses and high-rise buildings in a completely integrated fashion. There is no necessity to provide tracking means for any parts of the system in correspondence with the position of the sun. Moreover, the architectural profile of the building is not disturbed. The energy obtained from the fluorescent collectors can be exploited at the site for illumination, for the operation of machinery (e.g. air-conditioning, and appliances), for preparation of hot water, and many other uses.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In combination with a building wall wherein the building wall includes windows, window parapets and areas below the window parapets, the window parapets including overhanging lips defining slots with the areas beneath the parapets; fluorescent solar collectors received in the slots to form an exterior facing over the area beneath the parapets, photoelectric cell means arranged with the fluorescent panels and having leads thereon for conducting electric current therefrom, the photoelectric cell means being positioned within the slots so as to be protected thereby.

2. The combination of claim 1 further including a seal between the lips and fluorescent solar panels to protect the photoelectric cell means.

* * * * *